United States Patent
Coleman et al.

[11] Patent Number: 6,158,726
[45] Date of Patent: Dec. 12, 2000

[54] INTEGRATED CUP INSERT JOUNCE BUMPER

[75] Inventors: John F. Coleman, White Lake, Mich.; Mark E. Robertson, Deerfield, N.H.

[73] Assignee: Freudenberg NOK-General Partnership, Plymouth, Mich.

[21] Appl. No.: 09/075,682

[22] Filed: May 11, 1998

[51] Int. Cl.[7] .................................................. B60G 11/22
[52] U.S. Cl. ........................ 267/292; 267/140; 293/136; 403/14
[58] Field of Search ..................................... 267/292, 139, 267/140, 141, 152, 153; 293/136; 403/13, 14, 22

[56] References Cited

U.S. PATENT DOCUMENTS

| | | |
|---|---|---|
| 1,872,259 | 8/1932 | Eldridge . |
| 2,596,780 | 5/1952 | Meyers et al. . |
| 2,813,712 | 11/1957 | Stanis . |
| 3,343,770 | 9/1967 | Szonn . |
| 4,427,189 | 1/1984 | Kimura et al. . |
| 5,149,069 | 9/1992 | Hein . |
| 5,419,539 | 5/1995 | Bressler ................................. 267/292 |

FOREIGN PATENT DOCUMENTS

| | | |
|---|---|---|
| 1 285 338 | 8/1972 | United Kingdom . |
| 2 081 653 | 2/1982 | United Kingdom . |

*Primary Examiner*—Robert J Oberleitner
*Assistant Examiner*—Pamela J. Lipka
*Attorney, Agent, or Firm*—Dinnin & Dunn, PC

[57] ABSTRACT

A novel elastic bumper assembly put on an automotive vehicle or the like which includes an elastic bumper member adapted for repetitive cushioning against impacts, wherein the elastic bumper member is formed of a material selected from at least one of the group consisting of solid and foamed elastomeric materials. The elastic bumper member assembly further includes an insert member generally having a cup shape, the insert member having locking holes and dimples. The insert member is molded within the elastic bumper member. The insert member includes a locator projection which extends from the elastic bumper member. A fastener extends from the insert member through the elastic bumper assembly.

1 Claim, 1 Drawing Sheet

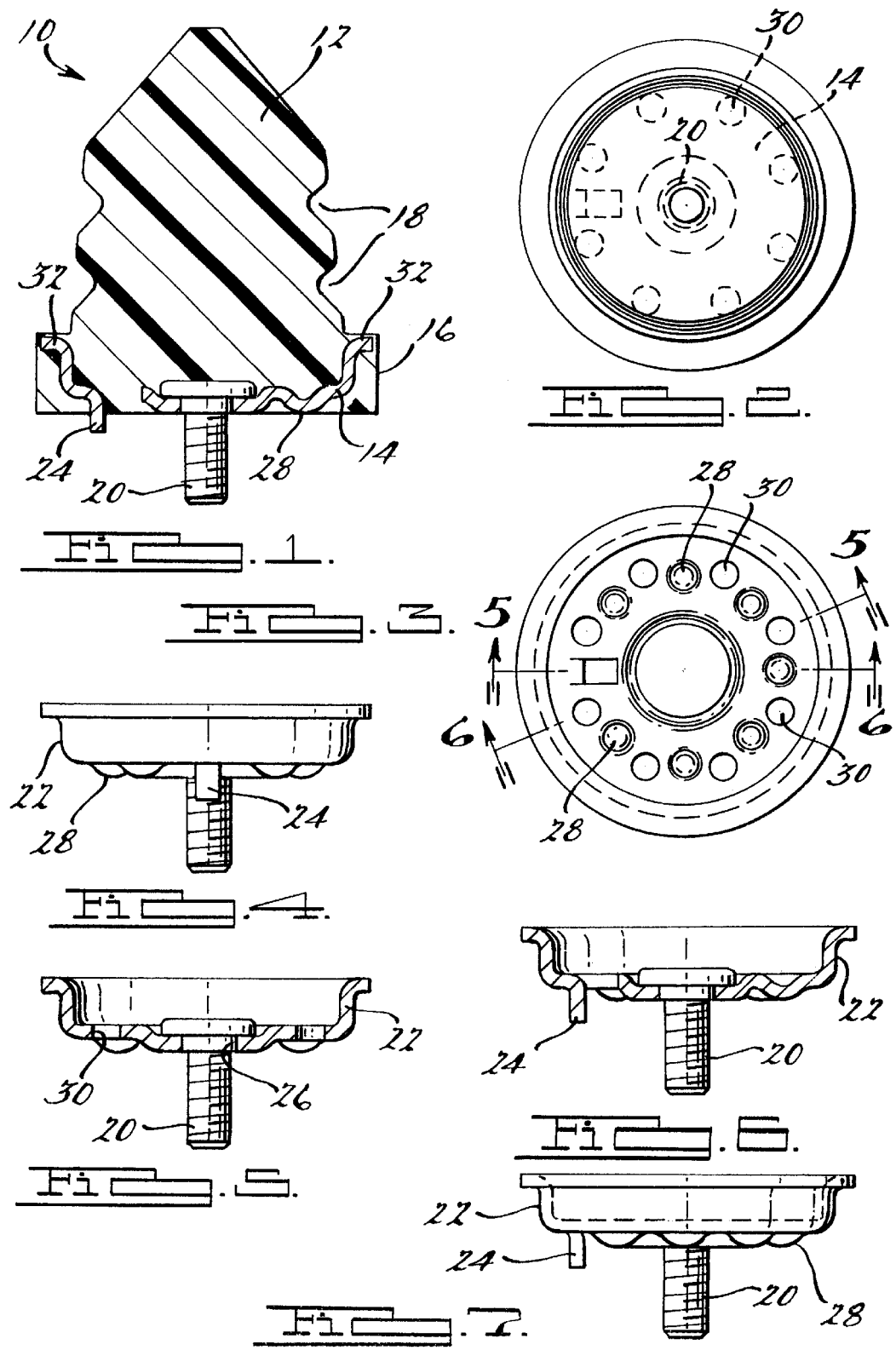

INTEGRATED CUP INSERT JOUNCE BUMPER

BACKGROUND OF THE INVENTION

1. Field of the Invention

The present invention relates to an elastic bumper device suitable for use in an automotive vehicle and more particularly to an elastic bumper device for other structural members which may be subject to rapid movements or vibrations, wherein an elastic bumper is desirable for shock absorption.

2. Description of Related Art

In the prior art various types of elastic bumper devices have been utilized in automotive vehicles such as trucks, vans and passenger vehicles in order to absorb or resist shocks which are caused when the axle of the vehicle is subjected to rapid or severe bumps. The rapid or severe bumps cause the vehicle axle to be moved upwardly toward the frame or body of the vehicle. While prior devices of this type have been utilized there have been significant difficulties in maintaining proper positioning and location of the devices and in the manufacture and shipment of the devices to the automotive manufacturers. Particularly, elastic bumper devices had been shipped without the cup insert secured to an elastomeric member thus creating a part that is not usable for attaching to a vehicle frame. Furthermore, the durability and longevity of prior art elastic member devices was substantially reduced when the cup was maintained on the outside of the urethane member because sudden and severe shocks or bumps with the automotive vehicle could dislodge the elastomeric member from the cup thus creating an inoperative bumper device that had to be replaced by an automotive manufacturer.

Therefore, there is a need in the art for an unitized one-piece integrated cup insert jounce member that is capable of taking the large shocks and bumps of the automotive vehicle while keeping the jounce bumper intact in one piece and operating as intended.

SUMMARY OF THE INVENTION

One object of the present invention is to provide a novel elastic bumper assembly which is economical to produce and is an unitized assembly.

Another object of the present invention is to provide an error-proof process of assembling the cup.

Another object of the present invention is to provide a corrosion resistant elastic bumper device.

Another object of the present invention is to reduce assembly steps and part count while also reducing excess weight of the elastomer bumper device.

Another object of the present invention is to have a less complex design with fewer parts and no assembly required for an elastic bumper device.

Another object of the present invention is to provide mechanical locking holes in the insert member such that it will provide locking urethane within the elastomeric bumper assembly.

Another object of the present invention is to provide a locking effect with a chemical bond between the insert member and the elastomer.

To achieve the foregoing objects an elastic bumper assembly is provided. The elastic bumper assembly includes an elastic bumper member adopted for repetitive cushioning against impacts. The elastic bumper member being formed of materials selected from at least one of the group consisting of solid and foamed elastomeric materials. An insert member generally having a cup shape wherein that insert member has locking holes and dimples. The insert member is molded within the elastic bumper member. The insert member can further include a locator projection which extends from the elastic bumper member. The elastic bumper assembly also includes a fastener extending from the insert member through the elastic bumper assembly.

One advantage of the present invention is that it provides an unitized easy-to-manufacture integrated cup insert jounce bumper.

Another advantage of the present invention is that it provides an error-proof process in manufacturing the jounce bumper such that each jounce bumper will be shipped whole and complete always including a cup and insert member.

Yet another advantage of the present invention is that the jounce bumper is corrosion resistant and secondary steps are eliminated from the manufacturing process.

Still another advantage of the present invention is that the part count is reduced for each jounce bumper and excess weight is removed by having a mechanical locking feature combined into the cup.

Still another advantage of the present invention is that the design is less complex and fewer parts and no assembly is required to make the jounce bumpers.

Yet another advantage of the present invention is that the rolled edge of the internal cup of the insert member increases part durability and the mechanical locking holes and dimples create a locking system for the urethane to the insert member.

Other objects, features and advantages of the present invention will become apparent from the subsequent description and appended claims, taken in conjunction with the accompanying drawings.

BRIEF DESCRIPTION OF THE DRAWINGS

FIG. 1 shows a cross-section of the present invention.

FIG. 2 shows a top view of the present invention.

FIG. 3 shows a top view of the insert member.

FIG. 4 shows a side view of the insert member.

FIG. 5 shows a cross-section of the insert member taken along line 5—5 of FIG. 3.

FIG. 6 shows a cross-section of the insert member taken along line 6—6 of FIG. 3.

FIG. 7 shows a perspective view of the insert member.

BEST MODE FOR CARRYING OUT THE INVENTION AND DESCRIPTION OF THE PREFERRED EMBODIMENT(S)

Referring to the drawings, an elastic bumper assembly 10 of the invention is shown. The bumper assembly 10 is constructed of two basic elements which are uniquely complimentary with one another, namely a shock absorbing bumper member 12, and an insert member 14. These two members work cooperatively with one another to solve the problems encountered with prior art devices in the field.

In particular the bumper member 12 generally has a cone shaped appearance with a circular disk shape 16 on the bottom portion and a plurality of grooves 18 around the circumference of the top portion. It should further be noted that the bumper member 12 can be molded from any number of different flexible elastomeric materials such as rubber, solid or foamed elastomers, urethanes, flexible resilient plastic materials. It should further be noted that the bumper assembly is positioned in an operative position and may be fastened either to the axle portion (not shown) of the vehicle, or to a frame or body member (not shown) of the vehicle. In any of the fastened positions, the bumper assembly is located such that it will provide cushioning against impacts between the sprung mass of the vehicle and the unsprung mass of the vehicle e.g., when a heavy bump or pot hole etc. is encountered by the moving vehicle.

The insert member 14 shown more specifically in FIGS. 3 through 7 is comprised of a fastener portion 20, a cupped shape portion 22, and a locator tab or projection 24. The fastener 20 can be a variety of different fasteners. In some designs a stud is required while with other designs a weld nut, a pierce nut, a spring tab, a "Christmas tree", or any other fastener capable of holding the parts weight in tension and resisting applicable shear loads may be used in the design and securement of the integrated cup insert and jounce bumper 10 to the vehicle. The fastener 20 is placed through an aperture 26 of the insert member 14 such that the fastener 20 extends from the bottom of the insert member 14. The insert member 14 includes a locator member or projection 24 which extends through the elastomer bumper member 12 and is used for reliably seating and positioning the assembly prior to its being fixedly positioned on the axle or frame member of the vehicle.

The cupped shape insert member 14 has a disk-shaped bottom and the disk-shaped bottom includes dimples 28 and apertures 30 spaced about a radius of the disk portion. The dimples 28 protrude in a downward direction towards the bottom of the insert member 14 and the apertures 30 are positioned in an alternating fashion with the dimples 28. The elevated or dimples portion 28 and perforated or aperture portion 30 of the bottom surface of the insert 14 allow urethane under the insert metal while the dimples 28 and raised surface transfer all compressive loads past the locking urethane about the bottom surface. The apertures 30 in the insert member 14 eliminate any need for retention by incorporating mechanical locks into the insert member 14. The insert member 14 also has rolled edges or curved edges 32 which substantially increases part durability when compared to straight wall cups in prior art devices. As the urethane compresses around a straight wall it will cut the urethane and thus decrease performance whereas within the rolled or curved edge cup, the urethane does not cut during compression and part durability is increased. When making the elastomer assembly the insert member 14 is completely molded within the elastic bumper member 12 such that only the fastener device 20 and locating projection 24 extend from the bottom of the elastomer bumper member 12. The entire cupped shape insert member 14 may be completely surrounded by the urethane and the urethane surrounds and fills about the dimples 28 and through the apertures 30 in the bottom surface of the insert member 14. This creates a mechanical lock with the urethane acting as a lock. It should also be noted that a chemical bond occurs between the insert member 14, and the elastomer. The chemical interaction between the elastomer and insert member 14 creates a locking effect via the created chemical bond.

Using the above process to assemble the integrated cup insert jounce bumper 10 creates an error-proof process where a part cannot be shipped without a cup like prior art jounce bumpers had been. Furthermore, corrosion resistance is not required when the insert cup member 14 is completely coated by and molded within the elastomer bumper member 12. Furthermore, secondary assembly steps are eliminated as the parts exit the oven ready to ship and the part count is reduced as two metal stampings are combined into one. Furthermore, weight is reduced since mechanical locking features are combined into the cup such that internal metal is not required thus saving the weight of having the internal metal part. The design is less complex, has fewer parts and no assembly is required with the jounce bumper.

The present invention has been described in an illustrative manner, it is to be understood that the terminology which has been used is intended to be in a nature of words of description rather than of limitation.

Many modifications and variations of the present invention are possible in light of the above teachings. Therefore, within the scope of the appended claims, the present invention may be practiced otherwise then as specifically described.

What is claim is:

1. A unitized elastic bumper assembly, said assembly including:

an elastic bumper member adapted for repetitive cushioning against impacts, said elastic bumper member formed of a material selected from at least one of the group consisting of solid and foamed elastomeric materials, said elastic bumper member having a circular disc shape and said elastic bumper member having a plurality of grooves;

a metal insert member generally having a cup shape, said insert member having locking apertures and dimples, said insert member is molded within said elastic bumper member, said insert member having a rolled edge at an entire circumference of a top end of said insert member, said insert member having an elevated and perforated bottom surface, said bottom surface allows said elastomeric material under said insert member and transfers all compressive loads past said elastomeric material under said insert member, said compressive loads are distributed through said insert member, said elastomeric material encapsulates said insert member and said elastomeric material flows into and around said dimples and apertures creating a lock, said rolled edge extends to an outer periphery of said elastic bumper member, said elastomeric material creates a corrosion resistant cover for said insert member;

said insert member includes a locator projection which extends from said elastic bumper member; and a fastener extending from said insert member through said elastic bumper member.

* * * * *